Jan. 13, 1942.　　　R. T. ANDERSON　　　2,269,898
TREATMENT OF OLEAGINOUS MATERIAL
Filed Aug. 21, 1939　　　2 Sheets-Sheet 1
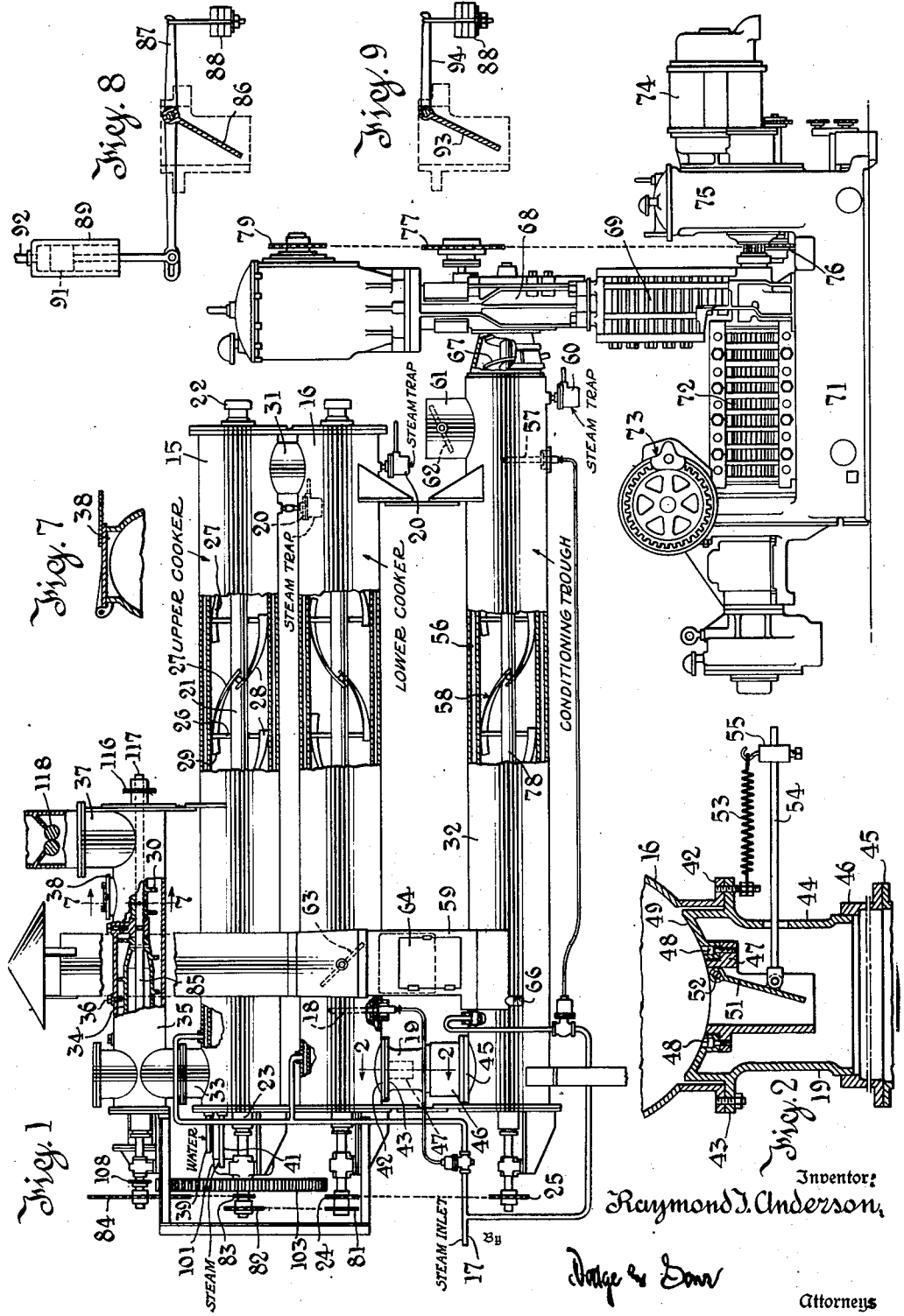
Inventor:
Raymond T. Anderson
Attorneys

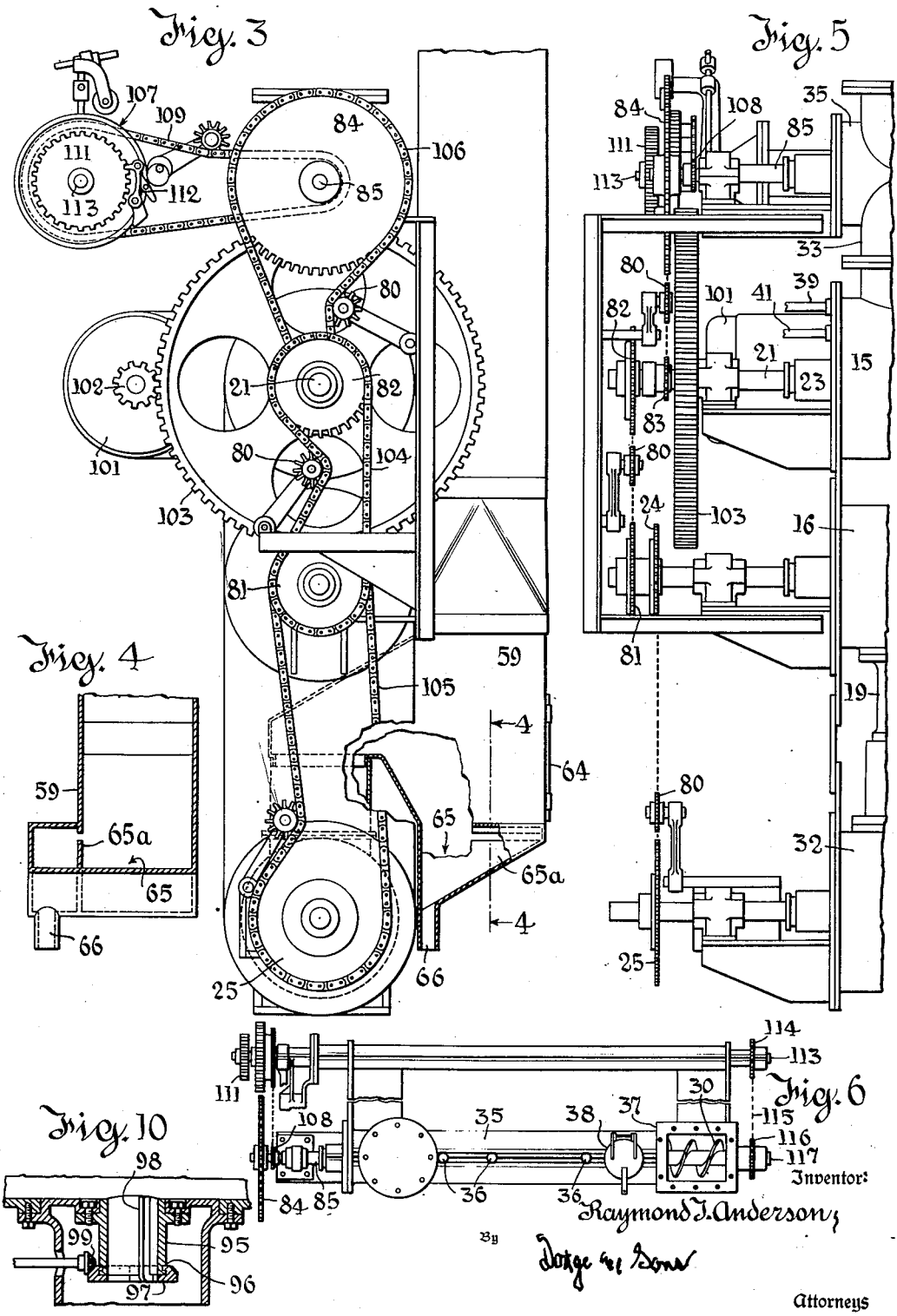

Patented Jan. 13, 1942

2,269,898

UNITED STATES PATENT OFFICE 2,269,898

TREATMENT OF OLEAGINOUS MATERIAL

Raymond T. Anderson, Berea, Ohio, assignor to The V. D. Anderson Company, Cleveland, Ohio, a corporation of Ohio Application August 21, 1939, Serial No. 291,274

10 Claims. (Cl. 23—290.5)

This invention relates to the recovery of oil from oil-bearing materials, be they of animal or vegetable origin. More particularly, it is directed to a continuous method of treating and expressing oil-bearing material in order to produce a maximum yield of first quality oil with a minimum refining loss and a minimum percentage of oil in the expressed cake. While, as indicated, the invention is of broad general application and may be applied to the treatment of numerous oil-bearing materials, for purposes of the present description, it will be described in connection with the processing of cotton seed, inasmuch as cotton seed presents one particular problem which has been solved in a highly satisfactory manner by the practice of this invention.

In the prior art relating to this subject, it has been suggested to treat material by a continuous process, but so far as I am aware, such processes have never been carried out in a thoroughly practical manner. If the material prior to expressing is heated to too high a temperature, harmful decomposition products are produced which adversely affect both the yield and the quality of the oil. If, on the other hand, the temperature is too low, the proteins are insufficiently coagulated, an excessive amount of foots is produced due to the material remaining in a less solid, more liquid form, and there is an increasing tendency for uncoagulated material, such as protein, to dissolve in the oil and affect the refining loss by acting as an emulsifying agent. Consequently, the main object of the present invention is to overcome the defects and disadvantages of the prior art and to subject the cotton seed or other oil bearing material to such treatment that material may be fed from a cooker to a press continuously, rapidly, and without interruption, to thereby produce high quality oil with a minimum of foots, with a minimum of oil in the expressed cake, and with a complete absence of deleterious color change in both the oil and cake.

While it is known in the prior art that oleaginous materials, such as cotton seed and the like, may be treated with live steam, particularly in batch cooking, the present invention makes use of the fact that by rolling the seeds or other material to be treated to thin flake form and subjecting them to treatment as flakes in a closed container, preferably above atmospheric pressure, the direct application of steam may be employed to sterilize the material instantly as it enters the closed cooker, and thus to destroy those fat splitting enzymes which otherwise would increase the free fatty acids, and also quickly to render insoluble those seed constituents which would adversely affect the oil quality if allowed to pass into the oil.

It is preferred to treat the material in a steam jacketed cooker wherein the material is subjected to rapid back and forth movement with a continuous forward travel at a maximum speed consistent with efficient disruption of the oil-bearing cells, a proper adjustment of moisture for subsequent expressing, proper coagulation of the proteins contained in the material, and coalescence of the gummy constituents, so as to provide for a maximum rate of extraction with a complete absence of moulds and lower organisms, and the production of a cake which is more palatable, and because of the inactivity of the gossypol, is more wholesome than that previously produced.

The present invention, therefore, is concerned with a continuous process of expressing in such manner as to produce oil of high quality and color, and reduce the refining loss. While various types of press may be employed, this invention finds its greatest application in the combination of a cooker employing steam sterilization, heated jackets and continuous agitation, feeding directly into the feed hopper of a press of the continuous screw type. Consequently, in describing the important aspects of the present invention, the illustration has been directed to the combination of a cooker and a press of the continuous screw type as above indicated.

The important features of the invention will be described in connection with the accompanying drawings, in which—

Figure 1 is a view in elevation of one form of mechanism embodying the present invention, the illustration being directed to a cooker feeding directly into a press, with parts broken away to show the interior construction;

Fig. 2 is a section of one form of discharge valve suitable for use in the cooker shown in Fig. 1, this section being taken on the line 2—2 of Fig. 1;

Fig. 3 is an end elevation of the arrangement of Fig. 1, showing the driving mechanism for the cooker and press;

Fig. 4 is a section on line 4—4 of Fig. 3;

Fig. 5 is a fragmentary side elevation of the driving mechanism of Fig. 3;

Fig. 6 is a plan view of the inlet feed hopper of the cooker shown in Fig. 1;

Fig. 7 is a sectional view on line 7—7 of Fig. 1;

Fig. 8 is a detail view of a modified form of discharge valve embodying a biasing weight and a pressure actuated piston;

Fig. 9 is a view similar to Fig. 8, omitting the piston; and

Fig. 10 is a view of a further modification of the cooker discharge in which the discharge valve is omitted and a scraping mechanism is employed to keep the discharge passage open for the discharge of material into the conditioning trough.

In describing the invention, reference may be had to Fig. 1, in which there is shown a pressure cooker having its discharge end feeding into a conditioning trough and thence to the feed hopper of a press of a known type similar to that illustrated in the patent to Anderson, No. 1,971,632. The cooker proper is made up of an upper section 15 and a lower section 16, each having a steam heated jacket to which steam may be supplied from a suitable source connected to pipe 17 and under the control of a thermal bulb 18 disposed in the lower cooker section adjacent the discharge 19. Suitable steam traps 20 are provided to receive and discharge the condensate which collects in the jackets. The bulb 18 is disposed inside of the cooker, so that it senses the temperature of the material within the cooker as it approaches the discharge, and in this way controls the supply of steam to the jackets, to produce as uniform as possible conditions of the material under treatment in the cooker. Each of the cooker sections contains a combined conveyer and agitator adapted to subject the material to a continuous back and forth movement which stirs, mixes it and causes it to travel along a heated wall at a high rate of speed.

The cooking of material such as cotton seed presents problems requiring nicety of control of both heating and agitation. The moisture in the material must be present in amounts which assist bursting of the oil-bearing cells and freeing of the oil. The presence of too much moisture interferes with efficient removal of the oil and lack of moisture is also disadvantageous. The temperature must be held within limits in order to prevent damaging of the oil, that is, in the treatment of cotton seed the maximum temperature, when cooking under pressure, should not exceed 270° F. Inasmuch as the rate of operation of a continuous screw press is extremely high, efficiency requires that the material be fed to the press at a constant maximum rate, and this means necessarily that in spite of the short period of time during which the material passes through the cooker it must be brought up to proper temperature for satisfactory cooking, and the temperature must be substantially uniform throughout the mass under treatment.

Consequently, it is desirable that the temperature in the cooker be maintained as high as possible without damaging the oil or the oil-bearing material, and this heating must be carried out quickly enough to coagulate the proteins and other materials so as to prevent them from hydrolyzing or peptizing into oil soluble products which might adversely affect the oil quality. Heating must be effective to that end without scorching due to contact between the material and the heated jacket. The seeds receive their heat principally by conduction from the heated jacket, and it has been found that the rate of heat transfer is increased if the material is moved rapidly along the jacket wall, whereas a slower movement results in a slower rate of cooking. Consequently, the material should be in thin layers and a high rate of lineal speed of travel of the material circumferentially along the heated jacket wall is desirable. For maximum rate of heating, therefore, the material should be caused to move at the maximum lineal speed which can be attained without injuring the material and yet assuring thorough cooking. In practice, it has been found that lineal speeds of the order of 475 feet per minute are not inconsistent with the conditions which have been found to be most desirable. In practical tests, utilizing a temperature within the cooker adjacent the discharge of between 240° and 270° F., with a lineal speed of movement of the order of 475 feet per minute, and with live steam injection by jets at about 150 pounds per square inch pressure, expanding down to about 2 or 3 pounds pressure within the cooking chamber, it has been possible to pass material through the cooker and to cook it and condition it for most efficient expressing of the oil by a treatment period of approximately 9 minutes.

As is well known, materials having the characteristics of cotton seed do not express well if the protein material is in too nearly a liquid condition, because too high a percentage of foots is expressed with the oil. On the other hand, the plastic condition of proteins consistent with a proper control of the foots in the oil, is conducive to very efficient extraction because the oil is freed of the oil-bearing cells and they may be removed readily without special precautions.

With this thought in mind, the conveyer-agitator in the top cooker section 15 comprises a shaft 21 mounted in suitable bearings 22, 23, and driven through a sprocket 24 connected to a similar sprocket which, as here shown, takes its drive from a motor in a manner which will be explained hereinafter. The shaft 21 carries a plurality of blade supporting pins 26 disposed in the form here shown at substantially 90° to one another and supporting a plurality of helical blades 27 designed to consume little power and to agitate the material and stir it up thoroughly while keeping it in motion with respect to the steam jacket. Alternate blades are disposed in opposite directions so that blades 27, for example, produce movement of the material from left to right in the top cooker section, whereas the alternate blades 28 tend to produce movement from right to left. As indicated at 29 the blades 27 are longer than the blades 28 and, consequently, give a resultant forward movement from left to right toward the discharge 31 of the top cooker section at a rate consistent with proper heating of the material under treatment.

The lower cooker section 16 is arranged similarly to the upper one, except that the resultant travel of the material is from right to left toward the discharge 19 of the cooker into the conditioning trough 32.

Inasmuch as it is preferable in the practice of this invention to operate the cooker slightly above atmospheric pressure, for example between 2 and 5 pounds gage pressure, means must be provided to maintain this pressure both at the inlet and the discharge of the cooker. A suitable valve may be provided at the discharge 19 to control this pressure, while the feeding means associated with the inlet to the cooker must perform a similar function. As illustrated and preferred, the inlet 33 of the upper cooker section 15 is supplied from a sectional feed screw 34 rotatably mounted in a jacket 35. This feed screw is made up of a plurality of separate worm flights as in the usual expeller press and includes stop screws 36 to prevent the material from rotating within its jacket. The casing 35 has a feed hopper 37 with worm 30 and a safety valve 38. The valve 38, as shown in detail in Fig. 7, is hinged to the casing and is biased by gravity to closed position. When back pressure of the material in chamber 35 builds up to an excessive degree, the cover automatically lifts to permit escape of any excess material until normal pressure conditions are restored. The arrangement of the feed screw 34 is such that friction between the casing 35 and the material held against rotation by the stop screws 36 prevents the material from being blown out by pressure within the cooker and, at the same time, insures a steady regular feed of compacted flake material to the inlet 33 of the upper cooker section, after being reduced to thin flake form by mechanism such as the rolls 118 conventionally shown in Fig. 1.

Associated with the cooker inlet 33 and feeding into its cooking chamber are a water supply pipe 39 and a steam supply pipe 41, Fig. 5. When desired, water may be added at 39 to increase the moisture content of the material under treatment. However, steam is supplied continuously in jet form through pipe 41 to instantly sterilize the material as it enters the cooker, and also render insoluble those seed constituents which otherwise might adversely affect oil quality. This steam is preferably live steam at a pressure of approximately 150 pounds per square inch. It expands and strikes the flaky material immediately and since material in moist condition is a better conductor of heat than dry material, it sterilizes the same instantly, killing the enzymes, and may also render the gossypol inactive, although this is not certain. Whether the cooker is operated at atmospheric pressure or above, the steam forms a blanket shutting off all air from the material in the cooker. The pressure of this steam also tends to assist the forward travel of the material from left to right in the cooker section 15, and causes it to engage the blades of the cooker agitator where it is subjected to agitation, as previously described, and then is fed forward while travelling circumferentially over the heated wall at a high rate of lineal speed consistent with proper and rapid conditioning of the material while preventing overheating or overchurning of the material.

While, as above indicated, it is possible to operate the cooker at atmospheric pressure, it is preferred to operate it at a pressure slightly in excess of atmospheric, namely between 2 and 5 pounds per square inch gage pressure. When in practice of the preferred form of the invention a discharge valve is utilized in the discharge pipe 19 leading to the conditioner 32, a valve such as shown in Fig. 2 may be utilized. The opening at the outlet end of bottom cooker section 16 leading to discharge 19 is flanged as at 42 and cooperates with a flange 43 on a tubular fitting 44. The inlet end of the casing of conditioner 32 carries a flange 45 similar to the flange 42 and adapted to carry an annular flanged member 46 in slidably engaging relation with the lower end of fitting 44. As a consequence of this arrangement, when it is unbolted, the fitting 44 may be slid up and down inside of the member 46, to permit ready inspection or removal of the valve. The valve proper comprises a body casting 47 which may be bolted or screwed at 48 to a reentrant flange 49 on the fitting 44. The valve casting 47, consequently, provides an opening of smaller diameter than that of the fitting adapted to be closed by a swinging or flap valve 51 pivoted at 52, and biased to closed position by a spring 53 which actuates a rod 54 connected to the valve. A spring tension adjusting member is provided at 55. Under preferred conditions of operation, the spring 53 is so adjusted that the valve 51 remains closed until the pressure within the cooker is 5 pounds. When, however, it reaches 5 pounds pressure, the valve is opened against the bias of the spring and material is continuously discharged into the conditioner 32 against the pressure of the spring tending to hold the valve closed. In this way, cooked material is discharged continuously into the conditioner while pressure within the cooker is maintained substantially constant and the live steam jet and the heating produced by the steam jackets maintain a temperature in the material being cooked such that when it approaches the thermal bulb 18 it will be at a temperature of between 240°-270° F. These figures are given for cotton seed and will obviously vary with the material under treatment.

The conditioner is basically of known construction and includes a casing containing a steam jacket space 56 supplied with steam from the source 17 and controlled by a thermal bulb 57 placed adjacent the discharge end where it leads to the expeller. Condensate is taken care of by a steam trap 60 connected to the lower side of the jacket. The conditioner contains a conveyer agitator 58 of construction similar to those described in connection with the cooker sections, and adapted to agitate the material thoroughly in order to place it under uniform conditions of temperature, consistency and humidity; and to feed it from left to right at a rate consistent with proper treatment and operation of the press to which it is delivered. The casing of the conditioner contains a stack 59 serving as an open but regulable vent to atmosphere for the conditioner chamber and adapted to permit the escape of steam from the material emptied into the conditioner by the discharge valve, and which conditioner also cools and suitably dries the material, so that as it approaches the outlet end of the conditioner its temperature has been suitably reduced to say, 230° F., and its moisture content may be in the neighborhood of 4%, which has been found to be the ideal condition for best operation of the press on cottonseed. Adjacent the outlet end of the conditioner is an air supply pipe 61 containing a damper 62, the position of which may be varied to control the air draft to the stack 59. A similar damper 63 is provided in the stack 59 so that by proper manipulation of the two dampers 62 and 63 the proper amount of natural flow of air by draft through stack 59 for both cooling and drying is obtained. If stack draft is not sufficient or is impractical, as on account of space limitations, an exhaust fan or other forced draft device may be employed. The stack contains a door 64 adjacent the conditioner which door provides access to the interior in order to remove solids which collect after condensation of the steam and moisture discharged into the stack. As best shown in Figs. 3 and 4, this stack contains a chamber or pocket 65 having a baffle 65a on one wall. Solids collect in this chamber while the water collecting in this chamber overflows the baffle 65a to water outlet 66. When the device is operating continuously, there is a continuous stream of water discharged through the outlet pipe 66, and the accumulation of solids within the chamber 65 takes place at such a rate that it must be removed frequently.

The conditioner contains a discharge worm 67 adjacent its outlet end and feeding into the feed hopper 68 of the press. Inasmuch as the details of the press are known and reference has already been had to a patent showing its construction, it will be sufficient for purposes of the present disclosure to indicate that the feed hopper 68 contains a feed screw which delivers the material to a vertical pressing barrel 69 where it is compacted and a portion of the oil expressed. The expressed oil is discharged into a reservoir contained in the base 71 of the machine, while the solid material from which a portion of the oil has been expressed is delivered to the horizontal barrel 72 where the final expressing step is performed, the oil being delivered to the oil reservoir and the solid cake containing, when treating cotton seed, approximately 3½% of oil, is discharged through a choke, the position of which may be controlled by the usual hand wheel mechanism 73 or equivalent means.

Although the driving mechanism of the present setup may assume various forms, in order to make the description complete it may be stated that the expressing worm inside of horizontal barrel 72 is driven from a motor 74 functioning through gear box 75, and also driving a sprocket 76 from which a suitable sprocket chain may pass over idler 77 to sprocket 79 to drive the vertical shaft of the feeder within feed chute 68.

A motor 101 (Fig. 3) drives the conditioner and cooker agitators as well as the feeder of the cooker. This motor is mounted on the cooker frame and has a pinion 102 meshing with a larger spur gear 103 on the shaft 21 of the agitator in upper cooker section 15. The outer end of shaft 21 carries two sprockets 82 and 83. Sprocket 82 is connected by chain 104 to sprocket 81 on the shaft of the lower cooker agitator. Sprocket 24 on the lower cooker agitator shaft, in turn, drives the conditioner through chain 105 and sprocket 25. The sprocket 83 on shaft 21 drives sprocket 84 through chain 106 and hence operates the cooker feed. Each of the chains has a cooperating idler 80 while there is associated with the drive of the cooker feeder a feed regulator designated generally by reference character 107. A sprocket 108 drives a chain 109 to operate shaft 113 through pawl 112 and ratchet wheel 111. A sprocket 114 on shaft 113 is connected by chain 115 to sprocket 116 on the shaft 117 which carries the feed screw 30 in hopper 37. The pawl 112 may be adjusted to vary the feed in accordance with conditions, that is, it may be caused to feed the wheel 111 and associated parts through one or more teeth at a time.

It will be understood from the foregoing that in the treatment of material such as cotton seed which has been reduced to thin flake form, as by rolling, this material is fed into the inlet hopper 37, fed forwardly and compressed by the sections of feed screw 34 and the inlet sealed against the escape of pressure from the cooker. Water may be added by pipe 39 when necessary. The compressed material is discharged at 33 into the upper cooker section 15 where it is immediately sterilized, before any cooking takes place, by contact with the live steam jet, and, if necessary, is further humidified. It is then fed forward, in the steam filled chamber, out of contact wtih air, with rapid agitation in heat conducting relation with the steam jacket within the cooker through pipe 31 to the lower cooker section where it is further agitated and treated until it reaches the discharge 19. During this travel, the steam jackets are suitably controlled by thermal bulb 18, to maintain the temperature of the material adjacent the discharge in the range between 230°–270° F., depending upon whether atmospheric or higher pressure is employed.

The material collects at the discharge end of the lower cooker section until the pressure builds up to that which is determined by the resistance of the valve 51, 86 or the like, controlling the discharge. Thereafter, so long as material is supplied to it in sufficient quantity, the cooker continuously discharges the material into the conditioner, where it is further agitated and stirred, while at the same time the steam or vapor is discharged through the stack and the material is dried by a counter current of air admitted to the conditioner through inlet 61. Here, also, the same air current cools the material below the cooking temperature, to insure light colored oil. The material properly cooked, cooled, conditioned, and dried is discharged by feed screw 67 into the feed chute 68 and is then expressed by the worms in barrels 69 and 72, the cake being discharged at the left hand end of the horizontal barrel 72 and the oil being collected in the reservoir 71. So long as material is fed to the inlet hopper 37 and all of the parts continue to operate, a high yield of light colored oil is produced in a continuous stream and a satisfactory edible cake is discharged from the press. Variations in conditions within the pressure cooker may be made in accordance with the moisture content of the material being fed to the hopper 37. During wet seasons, the moisture content of the cotton seed, assuming cotton seed is under treatment, may be such that the addition of water is unnecessary, and it may even be necessary to open the dampers 62 and 63 associated with the conditioner to carry out a rapid rate of drying. Under other conditions, a lower rate of drying may be required and it may even be necessary to add water at 39. When the cooker is operating at pressure above atmospheric, it is essential, in order to produce a good grade of oil, that the temperature within the conditioner should be lower than that in the cooker, because when the cooker is operated at pressure above atmospheric, it becomes possible to raise the temperature in the cooker so as to induce a higher rate of heating, without adversely affecting the material under treatment. If, however, the cooker is operating at atmospheric pressure, as by removing or omitting the discharge valve, then the temperature conditions in both the cooker and the conditioner should be the same, in order to prevent scorching of the material or otherwise affecting it adversely. The advantage of cooking at pressures above atmospheric is that higher temperatures may be utilized in the cooker, and thus more rapid heating may be accomplished without damaging the material under treatment.

As pointed out above, it is possible to utilize different types of discharge valve in the discharge 19. For example, it may be possible to use a valve of the type shown in Fig. 8. This valve includes a valve plate 86 biased to closed position by a lever 87 carrying an adjustable weight 88. A cylinder 89 containing a piston 91 may have its pipe 92 connected to the interior of the cooker. Since the piston is connected to the lever 87 at the end remote from the position of weight 88, the valve occupies a position determined by the balance established between the pressure within the cooker and the biasing effect of the weight. Such an arrangement under certain conditions may be desirable, because the position of the valve is more critical and more uniform conditions may be established in the cooker.

In a further aspect of the invention, the valve shown in Fig. 9 may be utilized. In this instance, the valve 93 is biased to closed position by a weighted arm 94 having a weight 88 similar to that shown in Fig. 8, but without the cylinder and piston.

As indicated above, maximum rate of operation of the mechanism described is obtained by the use of pressures above atmospheric, and particularly within the ranges specified. It is, therefore, preferred to operate at pressures above atmospheric. It has been discovered, however, that the natural tendency of the cooked material, and particularly of cotton seed, is to form and establish a plug which serves as an efficient and sufficient valve at the discharge from the cooker. In view of this discovery, it becomes possible to remove the discharge valve, leaving the opening containing the casting 41 unobstructed. Since the cooked seed is somewhat gelatinous, it will collect as a sort of closing plug for this opening and tend to build up and maintain in the cooker, as the result of the steam under pressure supplied thereto, an internal working pressure in the neighborhood of 2 to 3 pounds per square inch, with the material continuously passing through the discharge into the conditioner as it is advanced in the cooker. This takes place continuously and under some conditions operates satisfactorily without the provision of any mechanical valve structure.

Still another mode of operation which is contemplated by the present disclosure is that suggested by the arrangement shown in Fig. 10, in which the discharge valve is omitted and the cooker is operated at atmospheric pressure. Here, means in the form of a scraper may be provided to keep the discharge opening unobstructed and to prevent the material under treatment from building up its own plug valve and establishing a super-atmospheric pressure. The scraper may take numerous forms, only one of which is shown purely by way of example. In Fig. 10, the fitting 95 replaces casting 41 of Fig. 2 and is bolted in position in a similar manner. The lower end of the fitting 95 is rabbeted at 96 to receive a two-part annular gear member 97 which carries a scraper blade 98, moving in proximity to the inside surface of the fitting 95. A shaft 99 mounted in suitable bearings carries a bevel pinion meshing with the gear 97 and may cause rotation of the scraper blade 98 in order to keep the discharge free of accumulations. The gear members move in the rabbet which forms a guiding element, and, of course, may in practice include suitable anti-friction devices. The arrangement of Fig. 10 may obviously be replaced by other scraping mechanisms of simple form sufficient to keep the discharge clear and to permit the cooker to operate at substantially atmospheric pressure.

In this description it has been indicated that the discharge valve may take various forms as indicated in Figs. 2, 8 and 9, or may be omitted entirely, or be used with a scraper as indicated in Fig. 10. Still another practical possibility is the use of a screw flight mechanism similar to the feed screw 34, which may be mounted in the discharge from the cooker and at the same time operate as a sealing medium for that discharge. With the latter arrangement, of course, it will be necessary to so coordinate the rate of feeding and the rate of discharge as to insure complete treatment of the material passing through the cooker, and discharge of the material when it reaches proper condition. This feed screw at the discharge may be used either with or without the pressure responsive valve.

The invention is capable of numerous applications and although it has been described as directed particularly to the treatment of cotton seed, its use is not in any way limited to that particular material. The temperatures and other conditions stated will vary in accordance with the material under treatment, and it is to be understood that such changes are contemplated. It is accordingly to be understood that the invention is of broad general application and that it is not intended that it be limited specifically to the treatment of cotton seed except where the claims are directed to this particular material.

What is claimed is:

1. Apparatus for continuously treating oleaginous material, comprising a chamber having a heating jacket; means for feeding material into said chamber and sealing the inlet thereto; a discharge valve for the outlet from said chamber, said valve being biased to closed position and arranged to open and discharge material from said chamber when the pressure of the material upon said valve exceeds a predetermined value; and combined agitating and conveying means in said chamber for subjecting the material therein to continuous back-and-forth and mixing movements while conveying it from said inlet to said outlet at a predetermined rate.

2. Apparatus for continuously treating oleaginous material, comprising a jacketed chamber; means for heating said chamber to a predetermined temperature above the boiling point of water; an inlet for said chamber; means comprising a screw conveyer having a plurality of worm flights with interposed stop devices for compacting material to be heated and feeding it into said chamber while sealing said inlet against the escape of pressure from said chamber; combined agitating and conveying means for subjecting the material to back-and-forth movement at a rapid rate while feeding it through said chamber away from said inlet; a discharge opening in said chamber; and valve means associated with said opening and responsive to pressure in said chamber for maintaining predetermined pressure conditions in said chamber while discharging treated material therefrom.

3. Apparatus for continuously treating oleaginous material, comprising a jacketed chamber; means for heating said chamber to a predetermined temperature above the boiling point of water; an inlet for said chamber; means comprising a screw conveyer having a plurality of worm flights with interposed stop devices for compacting material to be treated and feeding it into said chamber while sealing said inlet against the escape of pressure from said chamber; combined agitating and conveying means for subjecting the material to back-and-forth movement at a rapid rate while feeding it through said chamber away from said inlet at a predetermined rate; a discharge valve for said chamber located remotely from said inlet and responsive to pressures above a predetermined value; and means for biasing said valve to closed position with a force determined by the pressure to be maintained in said chamber.

4. Apparatus for continuously treating oleaginous material, comprising a chamber having a heating jacket; continuous conveyer means for feeding material into said chamber and sealing the inlet thereto; a discharge valve for said chamber, said valve being biased to closed position and arranged to open and discharge material from said chamber when the pressure upon said valve exceeds a predetermined value; means for supplying a jet of live steam into said chamber at a point adjacent to said inlet to promptly sterilize the entering material and to augment the heating effect of said jacket; and combined agitating and conveying means in said chamber for subjecting the material therein to continuous back-and-forth and mixing movements while conveying it from said inlet to said outlet at a predetermined rate.

5. Apparatus for continuously treating oleaginous material, comprising a jacketed chamber; means for heating said chamber to a predetermined temperature above the boiling point of water; an inlet for said chamber; means comprising a screw conveyer having a plurality of worm flights with interposed stop devices for compacting material to be treated and feeding it into said chamber while sealing said inlet against the escape of pressure from said chamber; combined agitating and conveying means for subjecting the material to back-and-forth movement at a rapid rate while feeding it through said chamber away from said inlet; a discharge opening in said casing at a point spaced from said inlet; a flap valve in said opening; means for biasing said valve to closed position to maintain predetermined pressure conditions in said chamber and permit operation of said valve to discharge treated material at pressure above the predetermined value; and automatic means for controlling the temperature within said chamber.

6. Apparatus for continuously treating oleaginous material, comprising a plurality of superposed jacketed chambers forming a common treating chamber; an inlet adjacent one end of said chamber; an outlet adjacent the other end of said chamber; means for supplying heating medium to said jackets to control the temperature in said chamber; a feeder at said inlet and comprising a feed screw and separated worm flights with cooperating stop devices for compacting material to be treated and feeding it into said chamber; rotating means in said chamber for subjecting material therein to continuous rapid agitation while conveying it from said inlet to said outlet; and scraping means in said outlet for preventing the accumulation of treated material therein.

7. Apparatus for continuously treating oleaginous material, comprising a chamber having a heating jacket; means for feeding material into said chamber and sealing the inlet thereto; a discharge valve for the outlet from said chamber, said valve being biased to closed position and arranged to open and discharge material from said chamber when the pressure of the material upon said valve exceeds a predetermined value; combined agitating and conveying means in said chamber for subjecting the material therein to continuous back-and-forth and mixing movements while conveying it from said inlet to said outlet at a predetermined rate; and means for injecting steam into said chamber close to the inlet thereof to thereby promptly sterilize incoming material and also expedite cooking thereof.

8. Apparatus for continuously treating oleaginous material, comprising a chamber having a heating jacket and provided with inlet and outlet openings; means for continuously feeding material into said chamber and sealing the inlet thereto; means for injecting steam into said chamber close to the inlet thereof to thereby promptly sterilize incoming material and also expedite cooking thereof; combined agitating and conveying means in said chamber for subjecting the material therein to thorough agitation while continuously advancing it to and discharging it from said outlet; conditioning means to which the material discharged from said chamber is continuously supplied, said conditioning means including a chamber vented to atmosphere; means for conveying the material therethrough; and means for producing flow of air through said conditioning chamber in a direction opposite to the flow of material therein.

9. Apparatus for continuously treating oleaginous material, comprising a plurality of superposed jacketed chambers forming a common treating chamber; an inlet adjacent one end of said chamber; an outlet adjacent the other end of said chamber; means for supplying heating medium to said jackets to control the temperature in said chamber; a feeder at said inlet and comprising a feed screw and separated worm flights with cooperating stop devices for compacting material to be treated and feeding it into said chamber; a combined agitator and conveyer for subjecting material in said chamber to rapid agitation to facilitate treatment of the same while conveying from said inlet to said outlet; means for injecting steam into said chamber to quickly sterilize the material delivered thereto; means associated with the outlet of said treating chamber for maintaining the pressure therein above that of atmosphere; and means comprising a chamber open to atmosphere for drying the material discharged from said treating chamber.

10. Apparatus for continuously treating oleaginous material, comprising a plurality of superposed jacketed chambers forming a common treating chamber; an inlet adjacent one end of said chamber; an outlet adjacent the other end of said chamber; means for supplying heating medium to said jackets to control the temperature in said chamber; a feeder at said inlet and comprising a feed screw and separated worm flights with cooperating stop devices for compacting material to be treated and feeding it into said chamber; a combined agitator and conveyer for subjecting material in said chamber to rapid agitation to facilitate treatment of the same while conveying from said inlet to said outlet; means for injecting steam into said chamber to quickly sterilize the material delivered thereto; pressure responsive valve means associated with the outlet of said treating chamber for maintaining the pressure therein above that of atmosphere; and means comprising a chamber open to atmosphere for cooling and drying the material discharged from said treating chamber.

RAYMOND T. ANDERSON.